No. 826,960. PATENTED JULY 24, 1906.
W. D. O'BRIEN.
HORSESHOE.
APPLICATION FILED JAN. 12, 1906.
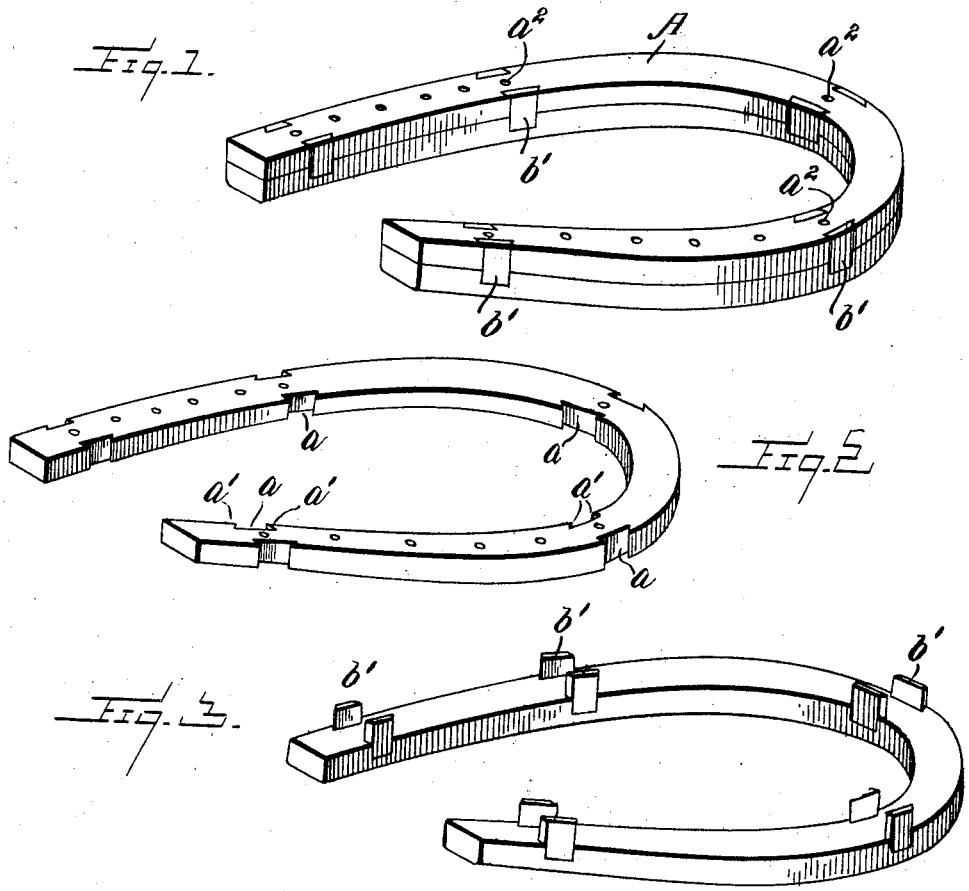
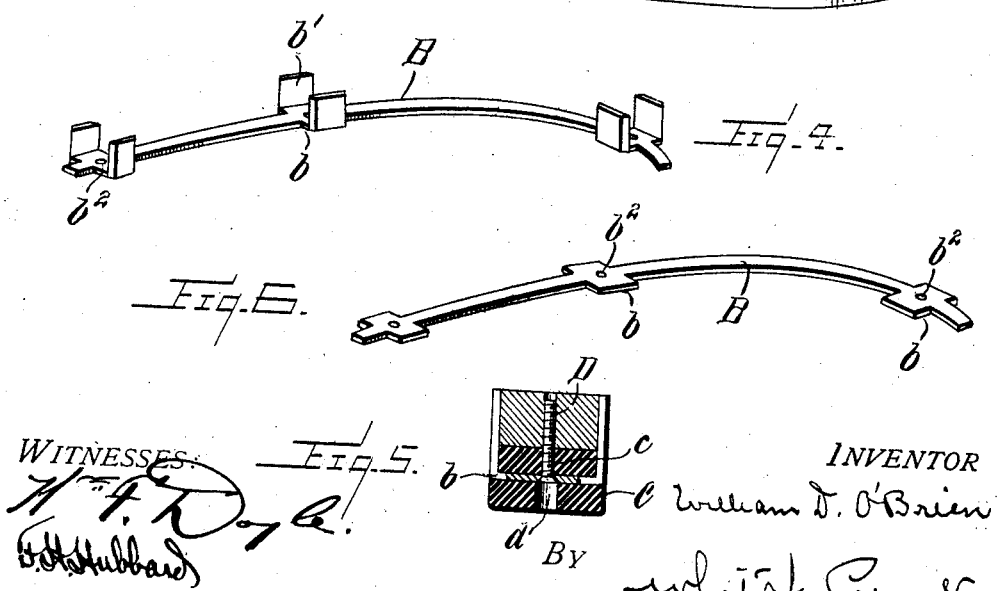
WITNESSES
INVENTOR
William D. O'Brien
By
Attorneys

UNITED STATES PATENT OFFICE.

WILLIAM D. O'BRIEN, OF SNOW SHOE, PENNSYLVANIA.

HORSESHOE.

No. 826,960.  Specification of Letters Patent.  Patented July 24, 1906.

Application filed January 12, 1906. Serial No. 295,796.

*To all whom it may concern:*

Be it known that I, WILLIAM D. O'BRIEN, a citizen of the United States, residing at Snow Shoe, in the county of Center and State of Pennsylvania, have invented certain new and useful Improvements in Horseshoes; and I do hereby declare the following to be a full, clear, and exact description of the invention, such as will enable others skilled in the art to which it appertains to make and use the same.

My invention relates to certain new and useful improvements in horseshoes having a soft tread portion; and the special object of my said invention is to produce a shoe the soft tread portion of which may be readily attached to and detached from the metal portion, but which will not be liable to accidental displacement.

In order that my invention may be thoroughly understood, I have clearly illustrated the same in the accompanying drawings, and a full and exact description thereof is contained in the annexed specification.

In the accompanying drawings, Figure 1 is a perspective view of my improved shoe. Fig. 2 is a perspective view of the metal portion thereof. Fig. 3 is a perspective view of the soft tread portion. Fig. 4 is a perspective view of a portion of the core and clips. Fig. 5 is an enlarged sectional view through the soft tread portion. Fig. 6 shows a slightly-modified form of core.

In the several views like letters of reference designate similar parts of my improved device.

A in the drawings designates the metal shoe portion of ordinary shape and size and provided on its edges with the vertical grooves $a$, said grooves being wider at the back than at the front, forming the inclined sides $a'$.

$a^2$ represents screw-threaded orifices extending through the metal shoe portion and preferably located between the corresponding grooves on the inside and outside of the shoe.

B designates the core, having a series of enlarged portions $b$, said enlarged portions being provided with the upwardly-extending portions $b'$ $b'$, corresponding in shape to said grooves $a$ and adapted to closely fit therein.

$b^2$ designates orifices located in the enlarged portions $b$ and are adapted to register with the orifices $a^2$ in the metal shoe portion.

C designates the soft tread portion molded onto said core B and provided with the orifices $c$, adapted to register with the holes $b^3$ and $a^2$, said orifices being larger in diameter below the portions $b$ than above.

D represents screws adapted to pass through the soft tread portion C and engage the threaded orifices $a^2$. The heads $d$ of said screws D are adapted to be countersunk in the soft tread portion C, as shown in Fig. 5, and bearing against the metal portions $b$.

From the foregoing it is obvious that the soft tread portion may be readily secured to the metal shoe portion after the same has been fastened in the usual manner to the hoof by first inserting the projections $b^2$ into the grooves $a$, which prevents the cushion from slipping on the metal portion, and then inserting the screws D, turning the same until the soft tread portion is tightly pressed against the metal portion. With this construction it is apparent that the cushion may at any time be readily detached and a new one applied in its stead.

In Fig. 6 I have shown a slightly-modified form of core, which in this instance is not provided with the upwardly-extending portions $b'$, and therefore when using such a construction it would be unnecessary to provide grooves in the metal portion. With this exception this device is similar to the one above described, and the manner of securing the cushion to the metal portion is substantially the same.

What I claim, and desire to secure by Letters Patent, is—

1. In a horseshoe of the kind described, the combination with a metal portion provided with threaded orifices, of a soft tread portion having a series of plates embedded therein and provided with orifices extending through said plates and registering with said threaded orifices in said metal portion, said metal plates being provided with upwardly-extending arms adapted to engage the edges of said metal portion and screws adapted to be inserted through the orifices in said soft tread portion into said threaded orfices in said metal portion, the heads of said screws being countersunk in said soft tread portion, substantially as described.

2. In a horseshoe of the kind described, the combination with a metal portion provided with threaded orifices and on its edges with grooves, of a soft tread portion having a series of plates embedded therein and provided with orifices extending through said plates and registering with said threaded orifices in said metal portion, said metal plates being provided with upwardly-projecting arms adapted to fit into said grooves in said metal portion, and screws adapted to be inserted through the orifices in said soft tread portion into said threaded orifices in said metal portion, the heads of said screws being countersunk in said soft tread portion, substantially as described.

3. In a horseshoe of the kind described, the combination with a metal portion provided with threaded orifices and on its edges with grooves, said grooves being wider at the back than at the front, of a soft tread portion having a series of plates embedded therein and provided with orifices extending through said plates and registering with said threaded orifices in said metal portion, said metal plates being provided with upwardly-projecting arms of corresponding shape to said grooves and adapted to fit therein and screws adapted to be inserted through said orifices in said soft tread portion into said threaded orifices of said metal plate, the heads of said screws being adapted to be countersunk in said soft tread portion, substantially as described.

4. In a horseshoe of the kind described, the combination with a metal portion provided with threaded orifices and on its edges with grooves, of a soft tread portion having a core provided with enlarged portions embedded therein, and provided with orifices extending through said enlarged portions of the core, and registering with said threaded orifices in said metal portion, said enlarged portions of said core being provided with upwardly-projecting arms adapted to fit into said grooves in said metal portion and screws adapted to be inserted through the orifices in said soft tread portion into said threaded orifices in said metal portion, the heads of said screws being countersunk in said soft tread portion, substantially as described.

In testimony whereof I affix my signature in the presence of two witnesses.

WILLIAM D. O'BRIEN.

Witnesses:
WILLIAM S. BUDINGER.
M. D. KELLEY.